(No Model.)

J. W. MALOY.
ORNAMENTING STONE.

No. 348,225. Patented Aug. 31, 1886.

Attests:
John G. Hinkel Jr.
H. E. Hansmann.

Jas. W. Maloy,
Inventor:
By Foster & Freeman
Attorneys.

UNITED STATES PATENT OFFICE.

JAMES W. MALOY, OF BOSTON, MASSACHUSETTS.

ORNAMENTING STONE.

SPECIFICATION forming part of Letters Patent No. 348,225, dated August 31, 1886.

Application filed February 19, 1885. Serial No. 156,410. (No model.)

*To all whom it may concern:*

Be it known that I, JAMES W. MALOY, of Boston, in the county of Suffolk and State of Massachusetts, have invented new and useful Improvements in Ornamenting and Shaping Stone and other Material, of which the following, taken in connection with the accompanying drawings, is a specification.

My invention has for its object to ornament slabs and objects of stone, clay, slate, marble, &c., in relief and intaglio, without the expensive hand-labor heretofore employed; and my invention consists in operating upon the objects by means of rocking or rolling dies, and an intervening attrition material, as fully set forth hereinafter, so as to rapidly wear away the object and produce an ornamental figure corresponding to that on the die.

Figure 1:
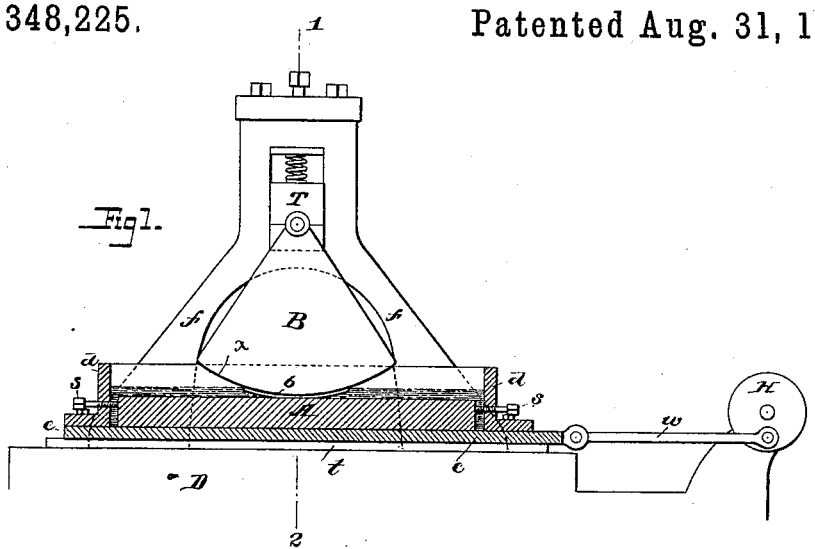
Figure 2:
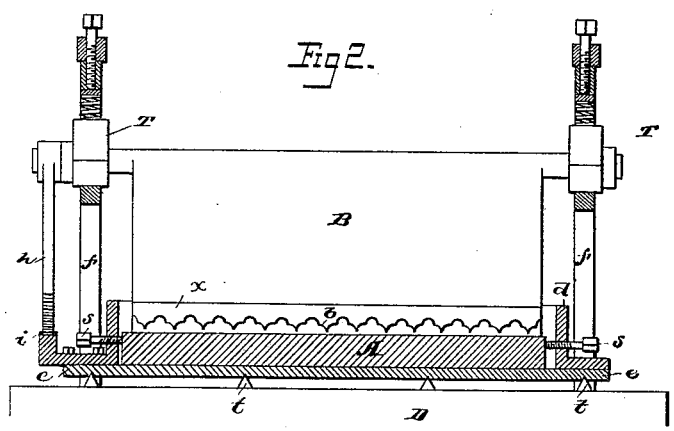
Figure 3:
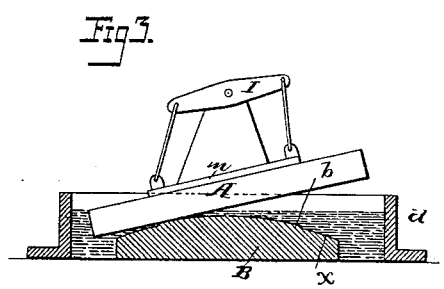
Figure 4:
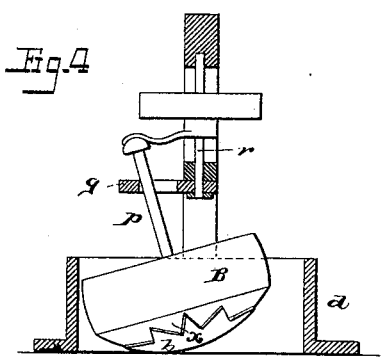

In the drawings, Figure 1 is an elevation, partly in section, of an apparatus, showing one mode of carrying out my invention. Fig. 2 is a transverse section on line 1 2, Fig. 1. Figs. 3 and 4 are partial sectional views showing different forms of dies and means for operating the latter.

In the manufacture of bas-reliefs and intaglios and other ornamental works in stone and marble it has been common to produce the desired effect by means of hand-work, the workmen chiseling or cutting away the stone or marble to the depth required. This operation is a slow one and requires both mechanical skill and artistic taste to produce results of more than ordinary excellence, so that work of this character is too expensive for use in general ornamentation. I have discovered that where great prominence or deep cutting or under cutting are not essential, such reliefs and intaglios may be produced mechanically from dies rolled upon or over the surface of the material to be formed or ornamented in connection with a suitable cutting or abrading agent in a powdered form.

In carrying out my invention I may use dies differently constructed and operated, it being essential only that the figured face of the die shall move to and from or roll upon the face of the stone with the attrition material between, but shall not slide or turn upon the stone or change its relation thereto in any manner to cause one part of the die to operate upon more than one part of the stone.

One apparatus which I have found effective in carrying out my invention is illustrated in the accompanying drawings, Figs. 1 and 2, in which A represents a slab of stone, slate, marble, brick, or other material to be ornamented, and B the die. As shown, the die has a face, $x$, corresponding to a section of a cylinder, and with a projecting figure, $b$, corresponding to the figure to be formed in intaglio upon the face of the slab. If, now, the surface of the slab be covered with a mixture of emery, corundum, sand, or other attrition agent and water, and the die B is placed in contact with the surface and pressed toward the same and simultaneously rolled and rocked without any other change in the relative position of the two, then the sand will be ground against the face of the slab and between the prominent parts of the figure $b$ and the slab until the latter is gradually worn away in such manner as to form a depression corresponding to the shape of the figure upon the die.

To preserve the requisite amount of attrition material upon the face of the stone, the face of the latter may be surrounded by a ledge or flange forming a receptacle. This ledge may be of wax, clay, or other plastic material. As shown, it is a metallic rim or flange, $d$, bolted to a bottom plate, $e$, constituting a bed on which the slab A is laid, and upon which it is held in place by screws $s$. Parallel grooves at the under side of the bed $e$ receive parallel guides $t$ on a foundation, D, so that the bed and the slab may be moved longitudinally back and forth with but little friction by means of a rotating crank-disk, H, connected to the bed by a rod, $w$. The axis of the die B corresponds to the center of a circle, the periphery of which coincides with the curved face $x$ of the die, and the die is provided with journals or trunnions coinciding axially with said axis and having their bearings in blocks T, sliding between guides in standards $f$, secured to the base or foundation D. The blocks are weighted or depressed by springs, so as to cause the die to press heavily upon the slab, but permits it to yield so as to maintain the contact as the slab is reciprocated and the die rocks and as the slab wears away.

To prevent any slipping or displacement of the die as respects the stone, one or both trunnions may be prolonged, and a toothed segment, h, secured thereto to gear with a rack, i, on the bed e, so that as the latter reciprocates the segment will be rocked and the die will swing therewith, so as that its face will travel at the same rate as that of the slab, whereby each portion of the figure b will at every reciprocation of the slab operate upon precisely the same portion of the latter. Any described figure or form on the die may be thus reproduced on the slab without the aid of skilled operatives or other supervision than is necessary to maintain the continued movement of the apparatus. The design may be sunken in the face of the die, in which case it will be reproduced on the slab in relief.

As illustrations of different modes of operating the stone and die, I have shown in Fig. 3 a stationary round-faced die, B, surrounded by a flange, d, to retain the attrition material, and a slab, A, resting on the die and secured to a stock, m, rocked by a vibratory lever, I, connected to the stock by rods. In Fig. 4 is shown a cylinder-die with a face, x, corresponding to a part of a sphere, and mechanism for rocking the die with a circular movement, a shaft or spindle, p, projecting axially from the die, passing through a slot in an arm, q, upon a vertical shaft, r, above the die. Whatever may be the form of the die or the mode of moving the same, the effect of the approach and recession of the die to and from the slab under pressure with an intervening attrition material is to rapidly wear away the slab at the points acted upon by the figure of the die.

It will be evident that dies may be constructed and arranged to operate upon slabs having curved or irregular surfaces.

The dies may be of steel, iron, (hardened or chilled,) or of other material.

I do not here claim the apparatus shown, as it will form the subject of a separate application for Letters Patent.

Without limiting myself to the use of any special form of dies or operating mechanism, I claim—

1. The within-described improvement in ornamenting objects of stone, clay, and other materials, the same consisting in rocking a figured die in contact with the object, with an intervening attrition material, substantially as described.

2. The mode of ornamenting objects of stone by means of dies moved upon said objects under pressure with an intervening attrition material, substantially as described.

In testimony whereof I have signed my name to this specification in the presence of two subscribing witnesses.

JAMES W. MALOY.

Witnesses:
CHARLES E. FOSTER,
GEORGE R. EAGER.